(12) United States Patent
Lerzer et al.

(10) Patent No.: US 8,531,940 B2
(45) Date of Patent: Sep. 10, 2013

(54) TECHNIQUE FOR INTERCONNECTING FUNCTIONAL MODULES OF AN APPARATUS

(75) Inventors: Jürgen Lerzer, Neumarkt/OPf (DE); Morten Christiansen, Arendal (NO); Marcus Mertens, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 356 days.

(21) Appl. No.: 12/809,582

(22) PCT Filed: Dec. 18, 2008

(86) PCT No.: PCT/EP2008/067843
§ 371 (c)(1), (2), (4) Date: Sep. 12, 2010

(87) PCT Pub. No.: WO2009/080688
PCT Pub. Date: Jul. 2, 2009

(65) Prior Publication Data
US 2011/0013624 A1    Jan. 20, 2011

Related U.S. Application Data

(60) Provisional application No. 61/016,460, filed on Dec. 22, 2007, provisional application No. 61/016,461, filed on Dec. 22, 2007, provisional application No. 61/029,462, filed on Feb. 18, 2008.

(30) Foreign Application Priority Data

Dec. 21, 2007   (EP) ..................................... 07025054
Dec. 21, 2007   (EP) ..................................... 07025057
Feb. 15, 2008   (EP) ..................................... 08002871

(51) Int. Cl.
*G01R 31/08*   (2006.01)

(52) U.S. Cl.
USPC ............................................ 370/216; 370/352

(58) Field of Classification Search
None
See application file for complete search history.

(56) References Cited

U.S. PATENT DOCUMENTS 6,072,793 A * 6/2000 Dunn et al. .................... 370/352
6,529,599 B1 * 3/2003 Gorshe ..................... 379/399.01

(Continued)

FOREIGN PATENT DOCUMENTS

CN        1417695 A        5/2003
DE    203 10 068 U1    12/2003

(Continued)

OTHER PUBLICATIONS

EP 94(3) Communication, dated May 8, 2012, in connection with European Patent Application No. 08 002 871.5.

(Continued)

*Primary Examiner* — Robert Wilson
(74) *Attorney, Agent, or Firm* — Potomac Patent Group PLLC (57) ABSTRACT

An apparatus such as a mobile telephone or a network card is described. In one implementation, the apparatus comprises a first functional module, a second functional module and a hub circuit. The hub circuit includes a first downstream port connectable to the first functional module, a second downstream port connectable to the second functional module and an upstream port adapted to be coupled to an external device. The hub circuit is configured to couple the upstream port with at least one of the first and second downstream port. Moreover, the hub circuit comprises a switching mechanism adapted to selectively couple the first downstream port internally within the hub circuit with the second downstream port to enable a data transfer between the first functional module and the second functional module.

24 Claims, 7 Drawing Sheets (56) References Cited

U.S. PATENT DOCUMENTS

| | | | |
|---|---|---|---|
| 6,636,478 B1* | 10/2003 | Sensel et al. | 370/216 |
| 7,298,898 B2* | 11/2007 | Haque et al. | 382/173 |
| 2003/0056138 A1* | 3/2003 | Ren | 714/4 |
| 2007/0173283 A1 | 7/2007 | Livet et al. | |

FOREIGN PATENT DOCUMENTS

| | | |
|---|---|---|
| WO | 00/22857 A1 | 4/2000 |
| WO | 2004/034266 A2 | 4/2004 |
| WO | 2006/108174 A2 | 10/2006 |

OTHER PUBLICATIONS

USB 2.0 Transceiver Macrocell Interface (UTMI) Specification, Version 1.05, Mar. 29, 2001, Intel Corporation, 1999-2001.

High-Speed Inter-Chip USB, Version 1.0, Sep. 23, 2007, Agere Systems, Inc., Hewlett-Packard Company, Intel Corporation, Microsoft Corporation, NEC Corporation, NXP Semiconductors, 2007.

UTMI+Low Pin Interface (ULPI) Specification, Revision 1.1, Oct. 20, 2004.

Chinese Office Action, dated Oct. 9, 2012, in connection with counterpart Chinese Patent Application No. 200880127091.8.

Translation of Chinese Office Action, dated Oct. 9, 2012, in connection with counterpart Chinese Patent Application No. 200880127091.8.

PCT International Search Report, dated May 20, 2009, in connection with International Application No. PCT/EP2008/067843.

Ajay V. Bhatt: "Creating a PCI Express? Interconnect" Internet Citation [Online] pp. 1-8, XP002506522. Retrieved from the Internet: URL: http://www.pcisig.com/specifications/pciexpress/resources/PCI_Express_White_Paper.pdf>, dated 2002.

Ghosh, A. et al.: "Open application environments in mobile devices: Focus on JME and Ericsson Mobile Platforms" Ericsson Review, [Online], vol. 82, No. 2, Dec. 19, 2005, pp. 82-91, XP002484529, ISSN: 0014-0171. Retrieved from the Internet: URL: http://www.ericsson.com/ericsson/corpinfo/publications/review/2005_02/files/200502.pdf.

* cited by examiner

Data paths through the system for mobile application use case

Fig. 3

Data paths through the system for USB Ethernet use case

TECHNIQUE FOR INTERCONNECTING FUNCTIONAL MODULES OF AN APPARATUS

CROSS-REFERENCE TO RELATED APPLICATIONS

This application claims priority under 35 U.S.C. §119 to European Patent Application Nos. 07025054.3, filed Dec. 21, 2007; 07025057.6, filed Dec. 21, 2007; and 08002871.5, filed Feb. 15, 2008 all of which are hereby incorporated herein by reference in their entirety. This application also claims the benefit of U.S. Provisional Application Nos. 61/016,460, filed Dec. 22, 2007; 61/016,461, filed Dec. 22, 2007; and 61/029,462, filed Feb. 18, 2008 all of which are hereby incorporated herein by reference in their entirety.

TECHNICAL FIELD

The present invention generally relates to an apparatus such as a mobile telephone or a network card with two or more functional modules. Specifically, the invention relates to a technique for selectively enabling a data transfer between the functional modules of such an apparatus.

BACKGROUND

Network access over Local Area Networks (LANs), Wireless LANs (WLANs) and cellular networks is becoming ubiquitous. It is therefore only a logical consequence that many mobile devices provide support for more than one Network Access Technique (NAT). From the perspective of modularity it is sometimes desirable to co-locate in one mobile apparatus two or more separate functional modules each supporting a different NAT. Such a modular approach facilitates re-using a functional module either in a stand-alone configuration or in any combination with other functional modules.

WO-A-00/22857 teaches a modular approach in which different network access modules (such as a Local Area Network (LAN) module and a Global System for Mobile communications (GSM) module) are interconnected via a communication bus according to the Universal Serial Bus (USB) standard. Other modules connected to the communication bus such as a Closed-Circuit Television (CCTV) module may then selectively transmit signals via the LAN module on the one hand or via the GSM module on the other.

A. Ghosh et al., "Open application environments in mobile devices: Focus on JME and Ericsson Mobile Functional modules", Ericsson Review No. 2, Vol. 82, 2005, pages 82 to 91 (ISSN: 0014-0171) describe a further modular approach for mobile devices. This approach is based on a functional module in the form of mobile platform with a digital baseband processor supporting one or more Radio Access Techniques (RATs) such as General Packet Radio Service (GPRS), Enhanced Data for GSM Evolution (EDGE) or Wideband Code-Division Multiple Access (WCDMA). The mobile platform module is an environment that includes all the necessary integrated circuits and software needed to provide wireless network access services and communication services (e.g. for voice, data or multimedia applications), as well as interfaces to make these services available to applications residing within or logically on top of the mobile platform module.

Ghosh et al. propose to add a further functional module in the form of an application platform module having a third-party application processor to a mobile device when it is desired to run an open operating system such as Symbian. The application platform module will be co-located with the mobile platform module in the mobile device and will handle software applications including, for example, multimedia applications. The mobile platform module, on the other hand, will remain in charge of mobile functionalities (including all mobile communication tasks such as providing wireless network access) and mainly act as a network access module.

For the reasons set forth above, many mobile devices comprise two or more different functional modules. Often, such mobile devices will additionally be configured to provide services (such as network access services or application services) to external devices such as Personal Computers (PCs) and Laptops.

SUMMARY

Accordingly, there is a need for an efficient technique for selectively coupling two or more functional modules comprised within an apparatus with each other or with another device.

According to a first aspect, this need is satisfied by an apparatus comprising at least one of a first functional module and a first contacting structure adapted to receive the first functional module, at least one of a second functional module and a second contacting structure adapted to receive the second functional module, and a hub circuit. The hub circuit comprises a first downstream port connectable to the first functional module, a second downstream port connectable to the second functional module, an upstream port adapted to be coupled to an host device, wherein the hub circuit is configured to couple the upstream port with at least one of the first and the second downstream ports, and a switching mechanism. The switching mechanism of the hub circuit is adapted to selectively couple the first downstream port internally within the hub circuit with the second downstream port to enable a data transfer between the first functional module and the second functional module.

The apparatus may be a finished product suitable for sale to an end customer or, in the alternative, a semi-finished product. The finished product comprises both the first functional module and the second functional module (plus many other components). The semi-finished product may, for example, not yet comprise the second functional module but only the contacting structure to receive the second functional module. The semi-finished product may, for example, be realized in the form of one or more Printed Circuit Boards, or PCBs. A contacting structure may include a chip socket, solder bumps, or the like as often provided on a PCB.

In one implementation, at least one of the functional modules is adapted to be re-used in different configurations according to a modular approach. One of the functional modules may, for example, be configured such that it can be used either in a stand-alone configuration or, in the alternative, in a dual (or triple etc.) mode configuration. In the latter case, two or more functional modules will be co-located in one and the same device and configured to communicate with each other. That is, each functional module may comprise one or more interfaces configured to be directly or indirectly coupled to one or more further functional modules of the device.

The device may further comprise a controller adapted to generate a control signal for controlling the switching mechanism. The controller may be responsive to one or more conditions or events such as the detection of the host device being coupled to the apparatus. Other possible events include a dedicated control command generated by one of the functional modules either autonomously or in response to a user interaction, a dedicated control command received from a network side, and the like. The controller may be integrated with the hub circuit or with one of the functional modules. The hub circuit may further comprise a control port adapted to receive the control signal generated by the controller.

The hub circuit may have various modes, and at least some of these modes may be assumed by the hub circuit in response to one or more control signals generated by the controller. The hub circuit may, for example, have one or more power-down modes. A first power-down mode may be assumed by the hub circuit when the hub circuit is in an idle state or when the switching mechanism is a switching state in which the downstream ports are interconnected (e.g., during a data transfer between the first functional and the second functional module). In the first power-down mode of the hub circuit at least those components that are required for keeping the downstream ports interconnected internally within the hub circuit will remain powered up. In a second power-down mode the hub circuit may by fully powered down (e.g., when no data transfer via the hub circuit is required because no host device is connected and one of the functional components is powered down).

In one implementation, the hub circuit further comprises a first interface component associated with the first downstream port and a second interface component associated with the second downstream port. The interface components may be realized in the form of hardware circuitry, in the form of software, or as a combination of hardware and software. The first interface component and the second interface component may be configured in accordance with at least one of the Universal Serial Bus 2.0 Transceiver Macrocell Interface (UTMI) standard, the UTMI Low Pincount Interface (ULPI) standard and the Universal Serial Bus High Speed Interchip (HSIC) standard. The UTMI and ULPI standards as understood herein comprise the UTMI+ extension as well as the UTMI+ Low Pincount Interface (ULPI) standard, respectively.

The hub circuit may further comprise a signal adaptor for converting between a digital signal domain on the one hand and an analog signal domain on the other. The signal adaptor may be realized in the form of a so-called PHY block that provides a bridge between digital and modulated parts of a hub circuit interface facing the upstream port. The signal adaptor may be configured in accordance with the USB standard.

The hub circuit may further comprise a transceiver component associated with one or both of the first and the second downstream ports. The transceiver component may be configured in accordance with a specific interface standard (such as the USB standard) to provide functionalities to such functional modules that have an interface core integrated on-chip, but that do not have the related analog circuitry. Typically, the transceiver will handle connection detection functionalities as well as the analog electrical signalling specified in the applicable interface standard. The transceiver component may, for example, comprise the signal adaptor and the interface components described above.

The hub circuit may be switchable into a bypass mode in which only the transceiver component (plus the upstream port and at least one of the downstream ports) is active. The bypass mode enables host devices not compatible with the hub mode (such as devices in accordance with the PictBridge standard) to utilize services provided by the apparatus.

The hub circuit may comprise several communication branches with each communication branch extending between the upstream port and one of the downstream ports. The hub circuit may be configured such that in the bypass mode only a single one of the communication branches is active. To this end, any components in the remaining communication branches may be de-activated.

In one implementation, the downstream ports are parallel ports and the upstream port is a serial port. In such an implementation, the hub circuit may further comprise at least one serial-to-parallel converter arranged between a parallel signal domain including the downstream ports and a serial signal domain including the upstream port. The parallel signal domain may be realized in accordance with the UTMI (including UTMI+ and ULPI) standard. The switching mechanism may be located in the parallel signal domain or in the serial signal domain. There may also exist realizations in which the switching mechanism is distributed among the parallel signal domain and the serial signal domain. In a HSIC scenario, the hub circuit (including the switching mechanism) may be realized completely in the serial signal domain.

The hub circuit can be realized in various ways. According to a first variant, the hub circuit is realized in the form of a dedicated integrated circuit. According to a second variant, the hub circuit is integrated with at least one of the first functional module and the second functional module (or with a part of the first functional module and/or a part of the second functional module) in an Application Specific Integrated Circuit (ASIC).

At least one of the first functional module and the second functional module may be adapted to provide one or more services. These services may be provided to at least one of the other functional module and the host device. Exemplary services provided by one or more of the functional modules include at least one of network access (and in particular wireless, e.g. cellular, network access), mass data storage, audio services, video services, multimedia services, Digital Rights Management (DRM), Object Exchange (OBEX) services, application services and device management services.

The first functional module may comprise a digital baseband processor configured in accordance with a first RAT. In a similar manner, the second functional module may also comprise a digital baseband processor configured in accordance with a second RAT. One or more of the functional modules may also comprise an application processor in addition or as an alternative to the digital baseband processor.

The upstream port and the downstream ports may be configured in accordance with various possible interface standards including the USB standard, the Universal Asynchronous Receiver Transmitter (UART) standard, the FireWire standard or any other open or proprietary interface standard. Each of the ports could be realized either as a serial port or as a parallel port. In one implementation, the upstream port is configured as a USB host port, and the two or more downstream ports are configured as USB device ports. In this implementation, at least one of the first functional module and the second functional module may be switchable between a USB device mode and a USB host mode.

The apparatus may be configured as at least one of a mobile terminal (such as a digital camera or a Personal Digital Assistant, PDA), a mobile telephone and a network card. Alternatively, the device may be configured as an ASIC for use in a mobile terminal, in a mobile telephone or in a network (or data) card.

The host device may be configured to function as a host component in the sense of the USB standard or other asymmetric bus standards that additionally define complementary components (sometimes called device components). Typically, there is a 1:n relationship between the host component and the device components. In the present case, the device components may be represented by one or more of the functional modules.

The host device can be an internal device of the apparatus (e.g. a further functional module) or an external device. An external host device may be configured as a personal computer, as a laptop, or as another stationary or mobile device. The apparatus may be configured to be connected to the host device via electrical contacts, via a cable or via a short-range wireless communication technology such as Bluetooth or any Wireless Local Area Network (WLAN) standard such as the IEEE 802.11 suite.

It should be noted that the apparatus is not restricted to comprising exactly two functional modules. Rather, the apparatus could also comprise three or more functional modules and/or three or more contacting structures for these three or more functional modules. In a similar manner, the hub circuit could have three or more downstream ports connectable to the three or more functional modules. In the case the host device is also configured as such a functional module, the upstream port may as well be coupled to a functional module.

According to a still further aspect, an integrated circuit for providing hub functionalities to an apparatus having a first functional module and a second functional module is provided, the integrated circuit comprising a switching mechanism, a first downstream port connectable to the first functional module, a second downstream port connectable to the second functional module, and an upstream port adapted to be coupled to a host device, wherein the integrated circuit is configured to couple the upstream port with at least one of the first and the second downstream ports. The switching mechanism is adapted to selectively couple the first downstream port internally within the integrated circuit with the second downstream port to enable a data transfer between the first functional module and the second functional module (via the integrated circuit).

The integrated circuit may further comprise at least one of a control port adapted to receive a control signal for controlling the switching mechanism, a signal adaptor for converting between a digital signal domain and an analog signal domain, and a transceiver component associated with one or both downstream ports. Further, the downstream ports may be parallel ports and the upstream port may be a serial port. One or more serial-to-parallel (including parallel-to-serial) converters may be arranged between the downstream ports and the upstream port.

According to a still further aspect, a method of controlling an apparatus having a first functional module, a second functional module and a hub circuit having a first downstream port connected to the first functional module, a second downstream connected to the second functional module and an upstream port adapted to be coupled to a host device is provided, wherein the hub circuit is configured to couple the upstream port with at least one of the first and the second downstream ports. The method comprises the steps of receiving a first control signal, and, in response to receipt of the first control signal, coupling the first downstream port internally within the hub circuit with the second downstream port to enable a data transfer between the first functional module and the second functional module.

The method may also comprise the steps of receiving a second control signal, and, in response to receipt of the second control signal, decoupling the first downstream port from the second downstream port to disable a data transfer between the first functional module and the second functional module. In one variation, a decoupling of the first downstream port from the second downstream port is accompanied by coupling both downstream ports via the hub circuit with the downstream port and with enabling a hub functionality of the hub circuit.

The second control signal may be generated in response to detection of the host device being coupled to the apparatus. In such scenario, the data transfer to and from the host device may thus have priority over a data transfer between the first and second functional modules. However, there may also exist scenarios with simultaneous data transfer to and from the external device and between the first and second functional modules.

The techniques presented herein may be realised in the form of software, in the form of hardware, or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a harddisk, and so on.

BRIEF DESCRIPTION OF THE DRAWINGS

Further aspects and advantages of the techniques presented herein will become apparent from the following description of preferred embodiments and the drawings, wherein.

DESCRIPTION OF PREFERRED EMBODIMENTS

In the following description of preferred embodiments, for purposes of explanation and not limitation, specific details are set forth (such as particular interfaces, network access technologies and sequences of steps) in order to provide a thorough understanding of the present invention. It will be apparent to one skilled in the art that the present invention may be practiced in other embodiments that depart from these specific details. For example, while the embodiments will primarily be described in context with third and fourth generation mobile communications standards such as the Universal Mobile Telecommunications System (UMTS) and Long Term Evolution (LTE) standards, respectively, it will be evident that the invention can also be practised in connection with a second generation mobile communications technology according to, for example, the GSM standard.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

Figure 1:
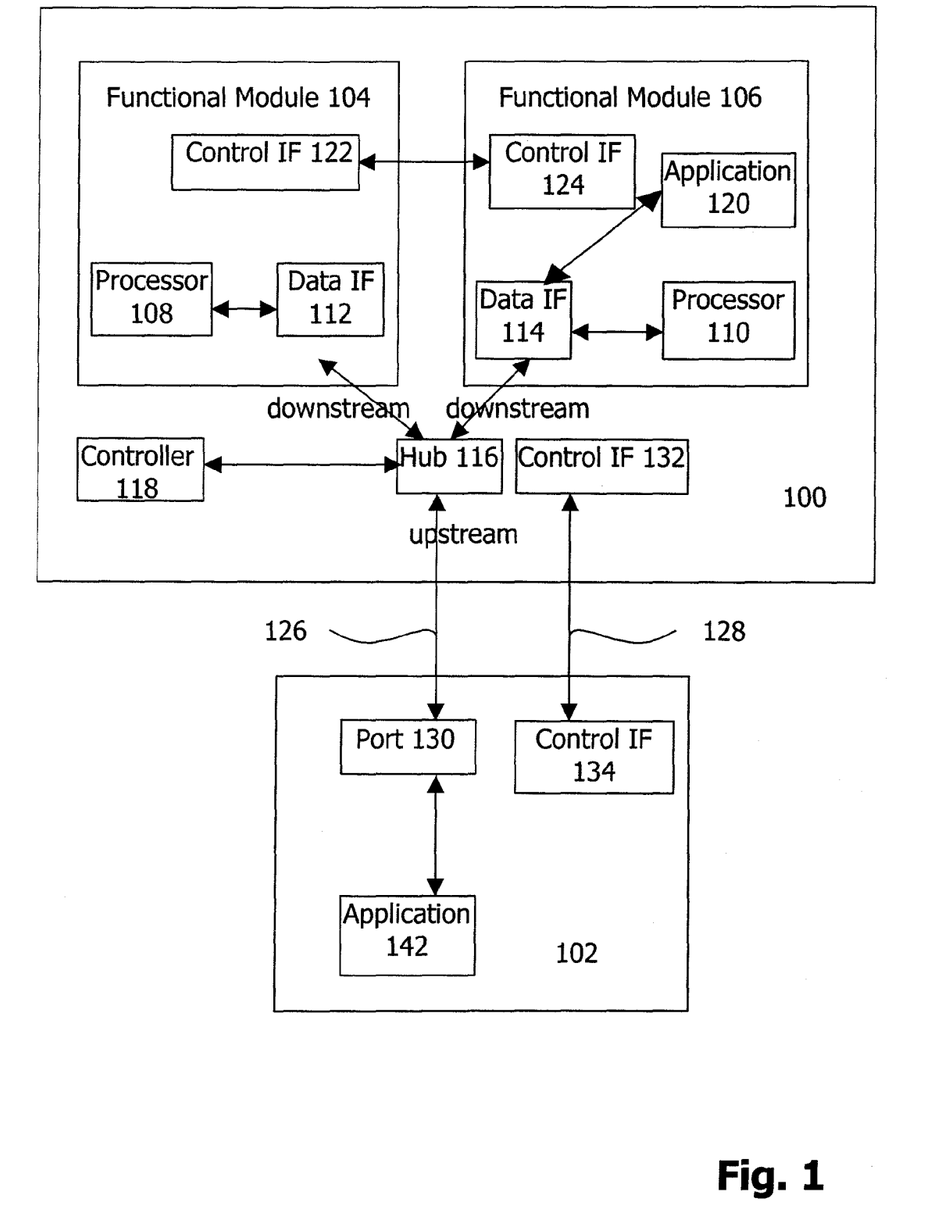
FIG. 1 shows an exemplary first communication system with an apparatus embodiment and an host device.

FIG. 1 shows an exemplary communication system comprising an embodiment of an apparatus 100 in the form of a mobile device as well as an external host device 102. In one example, the mobile device 100 is configured as a network card, and the external host device 102 is configured as a laptop having a standard slot for receiving the network card.

The mobile device 100 comprises two functional modules 104, 106 each supporting one or more RATs and each realized in the form of a separate integrated circuit. Support for a specific RAT includes the provision of at least one dedicated baseband processor 108, 110 for this RAT on the respective functional module 104, 106. Each functional module 104, 106 may further comprise dedicated RF components (such as RF amplifiers, not shown), or such RF components may be jointly used by the functional modules 104, 106. In other embodiments, at least the functional module 106 may be configured as an application module, and the associated baseband processor 110 may be replaced by an application processor. In still further embodiments, three or more functional modules may be installed on the mobile device 100.

The functional module 106 may be provided in the form of a platform main chip supporting one or more existing or legacy RATs such as EDGE, WCDMA (UMTS), GSM or High Speed Packet Access (HSPA) radio technologies. The other functional module 104 may be provided in the form of a platform co-chip supporting one or more upcoming or novel RATs such as LTE or evolved HSPA (eHSPA). The co-chip will typically have a reduced set of functionalities compared to the main chip.

The provision of two separate functional modules 104, 106 has advantages such as an increased flexibility and a reduced time-to-market. The higher flexibility results from the modular approach which permits a selective implementation of the functional modules 104, 106 either in stand-alone configurations or in dual-mode configurations as shown in FIG. 1. The reduced time-to-market is a consequence of the decreased complexity resulting from distributing support for different RATs among different functional modules 104, 106.

The functional modules 104, 106 comprise a plurality of interfaces. First of all, each functional module 104, 106 comprises a data interface 112, 114. The data interfaces 112, 114 are configured to be used by the external device 102 (or by the other functional module 104, 106) to obtain network access via the one or more RATs supported by the respective functional module 104, 106. In one implementation, the data interfaces 112, 114 are realized in accordance with the USB standard. Specifically, the data interfaces 112, 114 may be configured in accordance with a USB device class presenting the mobile device 100 as an Ethernet network card towards the external device 102. Suitable USB device classes providing Ethernet via USB include, for example, USB CDC ECM, USB CDC EEM, USB CDC ENCM, and USB NCM. It should be noted that the data interfaces 112, 114 towards the external device 102 need not necessarily be configured in accordance with the USB standard. Other possible interface standards include for example the FireWire standard or any proprietary standard.

In addition (or as an alternative) to presenting itself as a USB Ethernet network card towards the external device 102, the mobile device 100 may present itself also as an USB mass storage or as any USB audio/video/multimedia device to the external device 102 (if such services can be provided by one of the functional modules 104, 106).

The functional modules 104, 106 further comprise an inter-platform control interface 122, 124 each that will be utilized for the exchange of control signalling between the two functional modules 104, 106. Such control signalling may include Internal RAT (I RAT) synchronization, I RAT handover, Subscriber Identity Module (SIM) access from one functional module to the other functional module (in such a case only a single one of the two mobile functional modules 104, 106 needs to provide SIM access functionalities), and system control signalling including functional module wake-up functionalities.

The control interfaces 122, 124 can be configured in accordance with the UART standard, the USB standard, the General Purpose Input/Output (GPI O) standard or any proprietary standard. In the case the control interfaces 122, 124 are configured in accordance with the USB standard, they may at the same time be utilized for inter-platform data transfer. The differentiation between data interfaces on the one hand and control interfaces on the other hand mainly relates to the transferred information type. While data are generally generated or requested by a user or a user application, control information is typically only exchanged between lower layer components.

In the embodiment of FIG. 1, the two data interfaces 112, 114 are connected to respective downstream ports (not shown in FIG. 1) of a USB hub circuit 116 located on the mobile device 100. The hub circuit 116 presents the two data interfaces 112, 114 at a single physical upstream port (also not shown in FIG. 1) towards the external device 102. Accordingly, while there exist two logical USB Ethernet devices (represented by the data interfaces 112, 114) on the mobile device 100, only a single physical USB port will be presented towards the external device 102.

The terms downstream and upstream are utilized herein from the perspective of the external device 102. While the transfer of data from any of the functional modules 104, 106 to the external device 102 thus constitutes a download, a data transfer in the opposite direction (i.e., from the device 102 to one or both of the functional modules 104, 106) constitutes an upload. In the USB hub scenario of FIG. 1, the upstream port of the hub circuit 116 will be configured as a host port, while the downstream ports of the hub circuit 116 will be configured as device ports.

Figure 5:
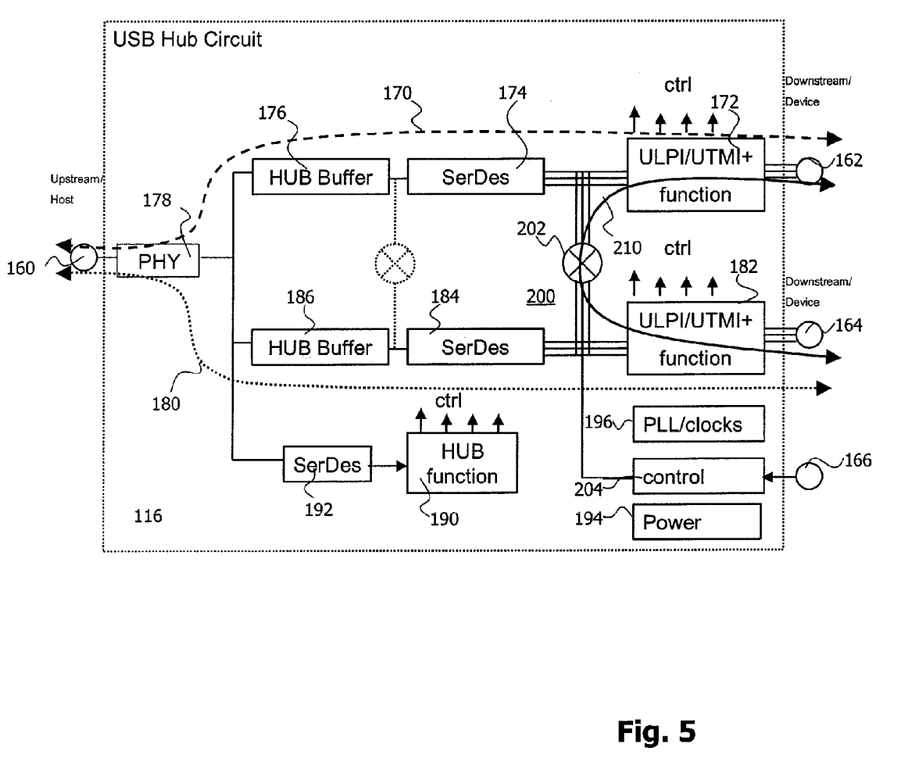
FIG. 5 shows the configuration of a hub circuit embodiment in accordance with the ULPI/UTMI+ standards.

The hub circuit 116 comprises a switching mechanism (as shown in FIG. 5) to internally couple the downstream ports with each other to enable a data transfer between the two functional modules 104, 106 via the hub circuit 116. The hub circuit 116 and in particular the switching state of its switching mechanism is controlled by a controller 118 residing anywhere within the mobile device 100 (for example on one or both of the functional modules 104, 106).

In a hub mode of the hub circuit 116, the data interface 112 of the functional module 104 and/or the data interface 114 of the functional module 106 are/is connected via the hub circuit 116 to the external device 102. In this mode, network access in accordance with the RAT supported by the respective functional module 104, 106 is provided to the external device 102 as will be discussed below with reference to FIG. 4.

In a "shortcut" mode of the hub circuit 116, the data interface 112 of the functional module 104 is directly coupled within the hub circuit 116 to the data interface 114 of the functional module 106. In this mode, an application 120 residing within or on top of the functional module 106 obtains network access via the RAT supported by the functional module 104 as will be explained below with reference to FIG. 3. It should be noted that the application 120 need not necessarily be deployed within the functional module 106, but could also be deployed on an application module coupled to the mobile functional module 106.

In an optional third mode, the data interface 112 of the functional module 104 is concurrently coupled with the data interface 114 of the functional module 106 and with the external device 102. In this mode, the application 120 residing on the mobile device 100 as well as the external device 102 are concurrently provided with network access via the RAT supported by the functional module 104.

There may, of course, exist further modes. For example there may exist a mode in which the data interface 112 of the functional module 104 is directly connected to the external device 102 without any hub functionalities in between. That is, all hub-specific components of the hub circuit 116 may in this mode be de-activated. Such a configuration may be required in context with the PictBridge protocol in the case the external device 102 is for example configured as a UBS printing device not capable of handling USB hubs.

The mode of the hub circuit 116 may be influenced by the presence of the external device 102. That is, the controller 118 may be adapted to detect whether or not the external device 102 is coupled to the mobile device 100. Depending on a result of this detection, the controller 118 may then control the hub circuit 116 in the required manner.

As shown in FIG. 1, the mobile device 100 communicates with the external device 102 via a data connection 126 on the one hand and a control connection 128 on the other. The data connection 126 stretches from the upstream port of the hub circuit 116 to a physical USB port 130 of the external device 102. Via the physical USB port 130, an application 142 residing on the external device 102 can exchange data with one or both of the functional modules 104, 106 (or any network behind these functional modules 104, 106). The control connection 128, on the other hand, stretches between a control interface 132 of the mobile device 100 and a corresponding control interface 134 of the external device 102. The control interfaces 132, 134 may be configured in accordance with the UART standard or any proprietary standard. Alternatively, the control interfaces 132, 134 could be omitted, and control signalling could be exchanged via the link between the upstream port of the hub circuit 116 and the USB port 130 of the external device 102.

Figure 2:
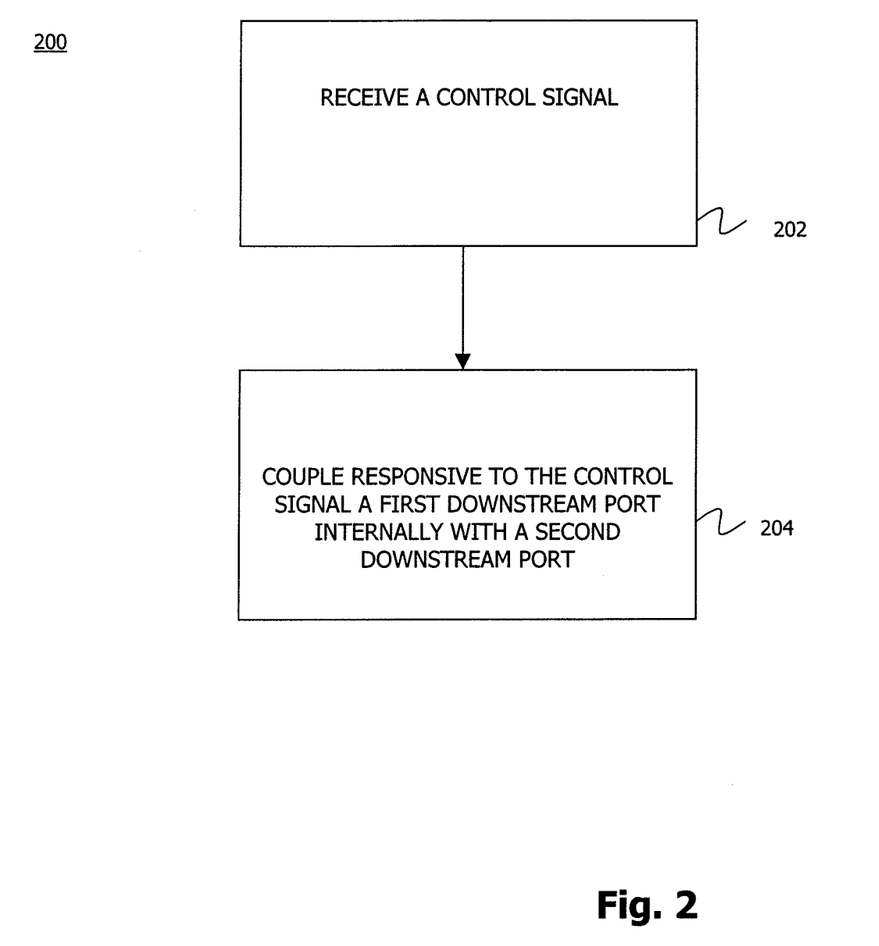
FIG. 2 schematically shows a flow diagram according to a method embodiment.

A flow diagram 200 shown in FIG. 2 illustrates in the form of a method embodiment the basic operations of the mobile device 100 illustrated in FIG. 1.

With respect to the flow diagram 200 of FIG. 2, the operation of the mobile device 100 starts with receipt of a control signal by the hub circuit 116 from the controller 118 in step 202.

In a next step 204, the switching mechanism realized in the hub circuit 116 is switched responsive to the control signal to a specific switching state. In this switching state, the first downstream port of the hub circuit 116 is coupled with the second downstream port of this circuit. A data transfer between the first functional module and a second functional module is enabled.

Figure 3:
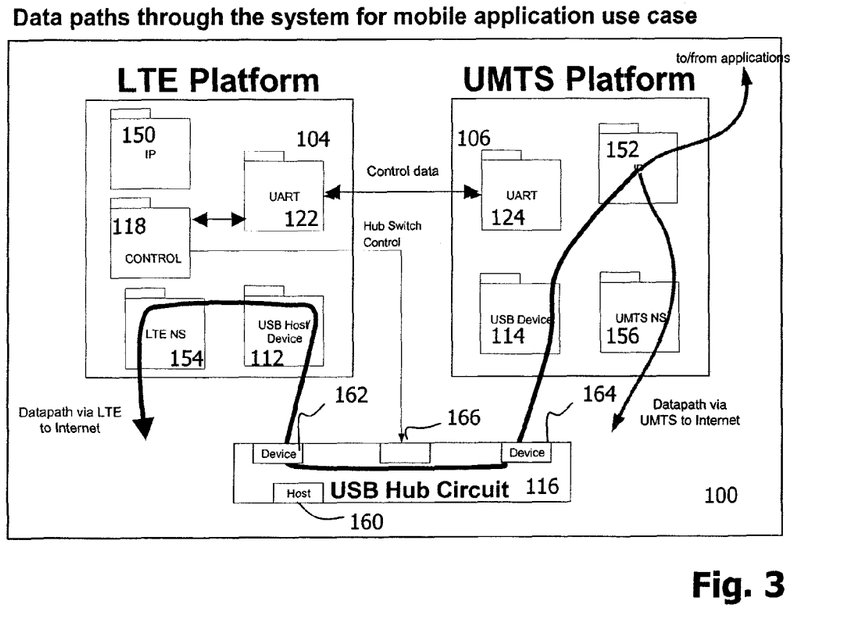
FIGS. 3 and 4 show an exemplary second communication system with an apparatus embodiment and a host device in two different communication configurations.
Figure 4:
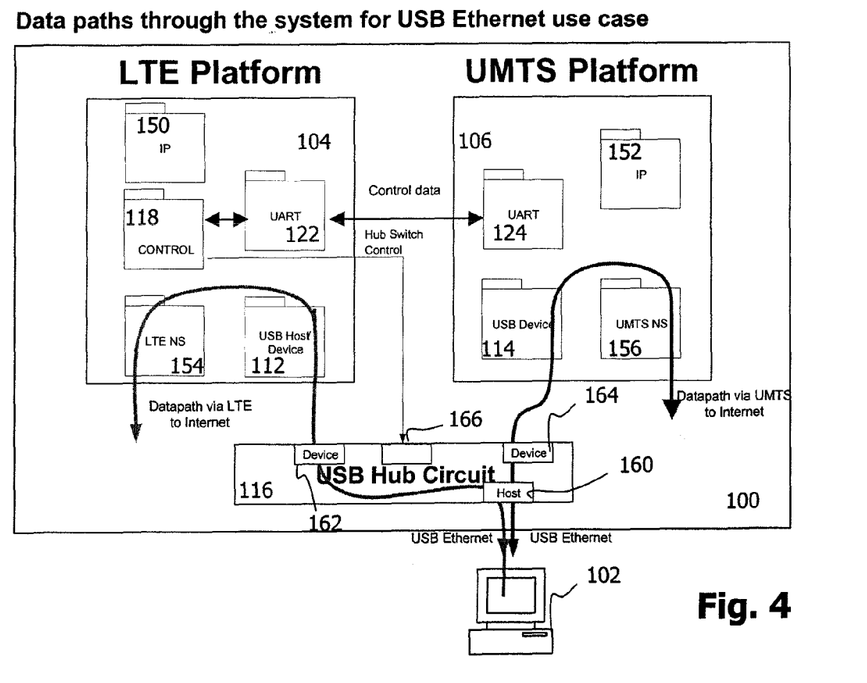

FIGS. 3 and 4 show in two different configurations a further system embodiment that may be derived from the system embodiment discussed above in context with FIG. 1. The same reference numerals will thus be used to identify the same or similar components.

In the embodiment shown in FIGS. 3 and 4, the mobile device 100 is again a dual-mode device comprising a first functional module 104 supporting LTE as a first RAT and a second functional module 106 supporting UMTS as a second RAT. The mobile device 100 further comprises a USB hub circuit 116 that can be realized either in the form of a separate integrated circuit or that could be integrated with for example the LTE platform module 104 (and its LTE baseband processor) in a single ASIC (the internal structure of the hub circuit 116 will be discussed below with reference to FIG. 5).

In addition to the components already discussed in context with FIG. 1 (and which are therefore partly not shown in FIGS. 3 and 4), each functional module 104, 106 comprises a network address management component 150, 152 in the form of an IP module with IP layer functionalities. The network address management components 150, 152 are configured to communicate with each other via UART control interfaces 122, 124. This inter-platform control communication between the two network address management components 150, 152 aims, inter alia, at synchronizing the IP stacks maintained by each network address signalling component 150, 152. Such a synchronization includes the transfer of an IP address temporally allocated to the mobile device 100 by the between the respective IP stacks. After the IP stack synchronization step, the two mobile functional modules 104, 106 will act towards the outside world (i.e., towards the LTE and UMTS networks and towards the external device 102) as if the mobile device 100 had only a single IP stack (and a single IP address).

As can be gathered from FIGS. 3 and 4, each functional module 104, 106 further comprises a network signalling module 154, 156 that constitutes an interface towards the associated LTE and UMTS access network. The network signalling modules 154, 156 are in charge of the signalling required to establish and maintain a network connection (e.g., a connection to the Internet) via the associated RAT.

The UMTS functional module 104 is configured to present itself as USB Ethernet Network Access Point (NAP) device giving the external device 102 (USB host) network access using UMTS via USB Ethernet. In a similar manner, the LTE functional module 106 is configured to present itself, via the USB interface 114, as USB Ethernet NAP device, thus giving the external device 102 network access using LTE via USB Ethernet.

Each of the functional modules 104, 106 provides a USB data interface 112, 114, respectively. The USB data interface 112 associated with the LTE platform module 104 is switchable between a host mode and a device mode, whereas the USB data interface 114 of the UMTS platform module 106 will be operated in the device mode. The data interface 112 of the LTE platform module is operated in the host mode when connected to the corresponding data interface 114 of the UMTS platform module 106 (as shown in FIG. 3), and in the device mode when connected to the external device 102 (as shown in FIG. 4).

As illustrated in FIGS. 3 and 4, the hub circuit 116 comprises four ports 160, 162, 164 and 166. An upstream port 160 of the hub circuit 116 is provided for being coupled to an external device 102. Two downstream ports 162, 164 of the hub circuit 116 are coupled to the data interfaces 112, 114 of LTE and UMTS platform modules 104, 106, respectively. A control port 166 of the hub circuit 116 is coupled to a controller 118 of the LTE platform module 104 for receipt of control signals influencing the internal switching state of the hub circuit 116. The two downstream ports 162, 164 interfacing the platform modules 104, 106 are configured as USB device ports, whereas the upstream port 160 interfacing the external device 102 is configured as USB host port.

The hub circuit 116 can assume a plurality of different modes depending on various conditions and events such as an application residing on the UMTS platform module 106 requesting LTE network access ("mobile application use case") and detection of the external device 102 being coupled to the mobile device 100 ("USB Ethernet use case"). The controller 118 residing on the LTE platform module 104 evaluates these (and other) events and conditions and controls the hub circuit 116 by transmission of a corresponding control signal via the control port 166. The mobile application use case (in which an application residing within or on top of the UMTS platform module 106 obtains LTE network access) is depicted in FIG. 3, whereas the USB Ethernet use case (in which the external device 102 obtains LTE and/or UMTS network access) is illustrated in FIG. 4.

In the mobile application use case of FIG. 3, a data path is established from the LTE platform module 104 through the hub circuit 116 to the UMTS platform module 106. The hub circuit 116 is in a switching state in which the two downstream ports 162, 164 are directly coupled with each other to establish a point-to-point USB connection between the two functional modules 104, 106 ("shortcut" mode). The data interface 112 of the LTE platform module 104 is operated in the USB host mode and the data interface 114 of the UMTS platform module 106 is operated in the USB device mode.

In the USB Ethernet use case depicted in FIG. 4, the hub circuit 116 is in a hub mode in which one or both of the downstream ports 162, 164 are coupled with the upstream port 160 such that a data path between one or both of the LTE and UMTS platform modules 104, 106 on the one hand and the external device 102 on the other hand is established. In this use case, the data interface 112 of the LTE platform module 104 and the data interface 114 of the UMTS platform module 106 are both operated in the USB device mode.

The hub circuit 116 is configured to switch between the two modes illustrated in FIGS. 3 and 4 in response to a control signal received from the controller 118 via the control port 166. For example, the UMTS platform module 106 may notify the LTE platform module 104 via the control connection established between the two control interfaces 122, 124 that an application residing within or on top of the UMTS platform module 106 requires LTE network access. In this case, the controller 118 residing on the LTE platform module 104 will control the hub circuit 116 such that the switching state the "shortcut" mode illustrated in FIG. 3 is assumed. In another scenario and upon detection of the external device 102 being coupled to the mobile device 100, the controller 118 may control the hub circuit 116 to assume illustrated in FIG. 4 (hub mode). The controller 118 may be programmed to prioritize one of the two modes shown in FIGS. 3 and 4.

The controller 118 may further be programmed to make more complex decisions and/or to control the hub circuit 116 in a more complex manner. For example, the hub circuit 116 may have a power-up mode and a power-down mode. The controller 118 may switch the hub circuit 116 into the power-up mode in the use case illustrated in FIG. 4 in which the hub circuit 116 acts in a similar manner as a conventional USB hub. On the other hand, the controller 118 may order the hub circuit 116 to assume the power-down mode in the use case of FIG. 3 to reduce the overall power consumption of the mobile device 100.

The hub circuit 116 may further be switchable by the controller 118 into a so-called bypass mode. As has been mentioned above, some devices (such as devices in accordance with the PictBridge standard) may not be compatible with USB hubs. Therefore, in case the controller 118 detects that the external device 102 is a device in accordance with the PictBridge standard, it may switch the hub circuit 116 into the bypass mode in which all hub-specific components (such as hub buffers or a hub controller) are de-activated.

In the following, the hub circuit 116 depicted in FIGS. 3 and 4 will be described in more detail with reference to the schematic block diagram shown in FIG. 5.

As becomes apparent from FIG. 5, the hub circuit 116 comprises a first signal branch 170 stretching between the upstream port 160 and the downstream port 162 (which is coupled to the LTE platform module) as well as a second signal branch 180 stretching between the upstream port 160 and the downstream port 164 (which is coupled with the UMTS platform module). Further signal branches and downstream ports can be added as needed.

Each signal branch 170, 180 comprises an interface component 172, 182, a serializing/de-serializing component 174, 184 and a hub buffer 176, 186, respectively. Moreover, both signal branches 170, 180 share a common signal adaptor 178 interfacing the upstream port 160. In addition to the hub buffers 176, 186, the hub circuit 116 comprises further standard components of a USB hub, such as a hub controller 190 with an associated serializing/de-serializing component 192, power circuitry 194 as well as a Phase-Locked Loop (PLL)/clocking component 196.

The hub circuit 116 also comprises a switching mechanism 200 including a switch 202 and a switch controller 204. The switch controller 204 is coupled with the control port 166 and interprets any control signals received via the control port 166 to control the switch 202 responsive to these control signals. The control port may include a control interface in accordance with at least one of the GPIO and I$^2$C standards.

In the embodiment shown in FIG. 5, the interface components 172, 182 are configured in accordance with the ULPI/UTMI+ standards. These standards are parallel bus standards, whereas the signal adaptor 178 is configured to connect to a serial bus in accordance with the USB standard. For this reason, the serializing/de-serializing components 174, 184 are coupled between each of the interface components 172, 182 on the one hand and the signal adaptor 178 on the other. The serializing/de-serializing components 174, 184 transform any signals received from the parallel ULPI/UTMI+ domain into signals in accordance with the serial USB domain, and vice versa.

The signal adaptor 178 interfacing the upstream port 160 is configured as a so-called PHY block that provides a bridge between the digital signal domain of the hub circuit 116 on the one hand and the analog (modulated) signal domain of the USB host port 160. This bridging functionality of the signal adaptor 178 may include, for example, the adaptation of voltage levels and the provision of USB specific cable connectors with the required USB specific contacts.

As shown in FIG. 5, the switch 202 is arranged in the parallel signal domain. Specifically, the switch 202 is configured to interconnect the two signal branches 170, 180 between the respective interface component 172, 182 on the one hand and the respective serializing/de-serializing component 174, 184 on the other hand. As indicated by dotted lines in FIG. 5, the switch 202 could alternatively be placed in the serial signal domain such that the two signal branches 170, 180 are bridged between the respective serializing/de-serializing component 174, 184 and the respective hub buffer 176, 186.

The switch 202 can assume several switching states under control of the switch controller 204. As mentioned above, the switch controller 204 is in charge of interpreting and implementing any control signals received via the control port 166 from an external controller. Such control signals may take the form of well-defined voltage levels applied to the control port 166.

In the present embodiment, the switch 202 can assume one of two discrete switching states. In a first switching state ("OFF") of the switch 202, the two signal branches 170, 180 are not bridged (i.e., the associated functional modules are disconnected). In this switching state, the hub circuit 116 will operate similar to a conventional USB hub (i.e., in the hub mode). The upstream port 160 is coupled with both downstream ports 162, 164, and an external device coupled to the upstream port 160 may access the services provided by the respective functional modules coupled to the downstream ports 162, 164 (see FIG. 4).

In a second switching state ("ON") of the switch 202, the two signal branches 170, 180 are bridged to provide a point-to-point connection 210 between the functional modules coupled to the downstream ports 162, 164. In the second switching state, a data transfer between the functional modules is thus enabled (see FIG. 3).

In one implementation, the switch 202 is controlled such that the second switching state ("ON") can only be assumed when there is no external device coupled to the upstream port 160. In other implementations, which might require a more complex switching mechanism, the switch 202 can assume the second switching state while the external device is coupled to the upstream port 160. Such an implementation will, for example, allow both the external device coupled to the upstream port 160 and a first functional module coupled to the downstream port 164 to access the services (e.g., LTE network access) provided by a second functional module coupled to the downstream port 162.

Since the hub functionalities of the hub circuit 116 are only required when there is an external device coupled to the upstream port 160, the standard hub components (including the hub buffers 176, 186, the serializing/de-serializing component 192 and the hub controller 190) may be powered down when there is no external device coupled to the upstream port 160. Accordingly, the hub circuit 116 may be provided with a corresponding power-down mode. In the power-down mode, the total power consumption of the mobile terminal will be reduced. The power-down mode could also be assumed by the hub circuit 116 in the second switching state of the switch 202 when the two functional modules are directly coupled with each other.

The interface components 172, 182, the serializing/de-serializing components 174, 184 and the signal adaptor 178 form a USB transceiver. Such USB transceivers provide specific USB functionalities to the functional modules coupled to the downstream ports 162, 164. These functional modules typically have the digital USB core components integrated on-chip, but do not have, for example, the required analog USB circuitry. Such missing USB functionalities are provided by the transceiver entities 172, 182, 174, 184, 178, including the handling of connection detection and the provision of the analog electrical signalling in accordance with the USB standard.

Certain external devices including many devices in accordance with the PictBridge standard may not be compatible with USB hubs. In order to allow a data transfer between such devices and the functional modules installed on the mobile device, the hub circuit 116 may be switchable between a regular operational mode (in which at least the switching mechanism 200 is active) and a bypass mode (in which only some or all of the transceiver entities 172, 182, 174, 184, 178 are active). In the bypass mode, the standard hub components including the hub buffers 176, 186, the serializing/de-serializing component 192 and the hub controller 190 may be de-activated (e.g., powered down). Moreover, the transceiver entities of one of the two signal branches 170, 180 that is currently not needed may additionally be de-activated.

Figure 6:
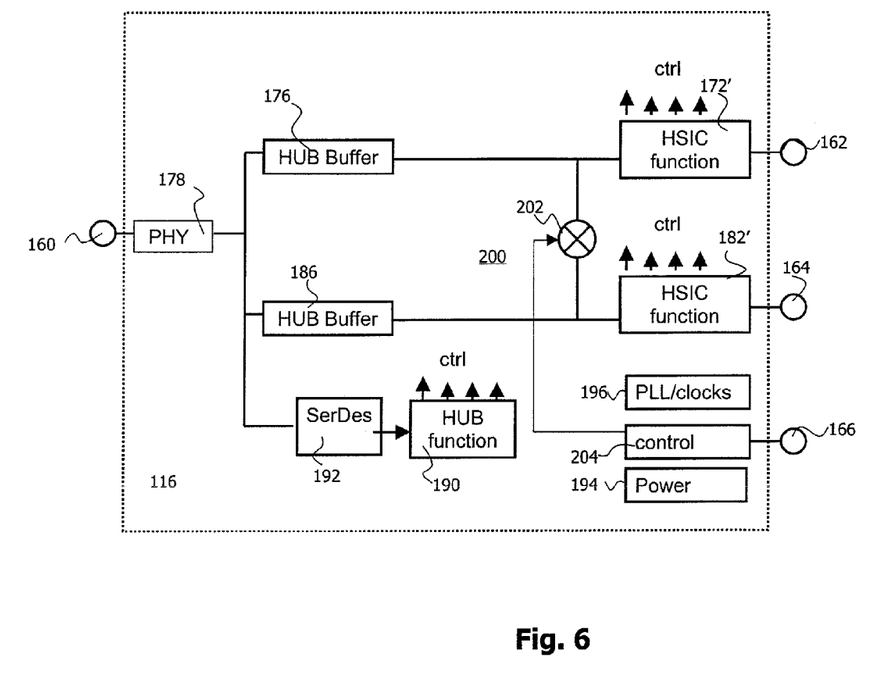
FIG. 6 shows the configuration of a hub circuit embodiment in accordance with the UBS HSIC standard.

In the embodiment illustrated in FIG. 5, the interface components 172, 182 are configured in accordance with the ULPI/UTMI+ standards. It should be noted that the interface components 172, 182 could alternatively be implemented in accordance with the USB HSIC standard as illustrated in FIG. 6. Since the USB HSIC standard specifies serial interfaces, the serializing/de-serializing components 174, 184 may then be omitted. In other configurations, USB HSIC interface components 172', 182' could be provided in addition to the ULPI/UTMI+ interface components 172, 182. In such a scenario, either one or more of the HSIC interface components 172', 182' or one or more of the ULPI/UTMI+ interface components 172, 182 may be activated in response to a control signal received via the control port 166.

The hub circuit 116 could also be provided with support for transaction translators to support also full-speed USB hosts and devices. Moreover, support for the detection of battery chargers could be provided in order to distinguish whether a USB host or a battery charger is connected to the upstream port 160.

Figure 7:
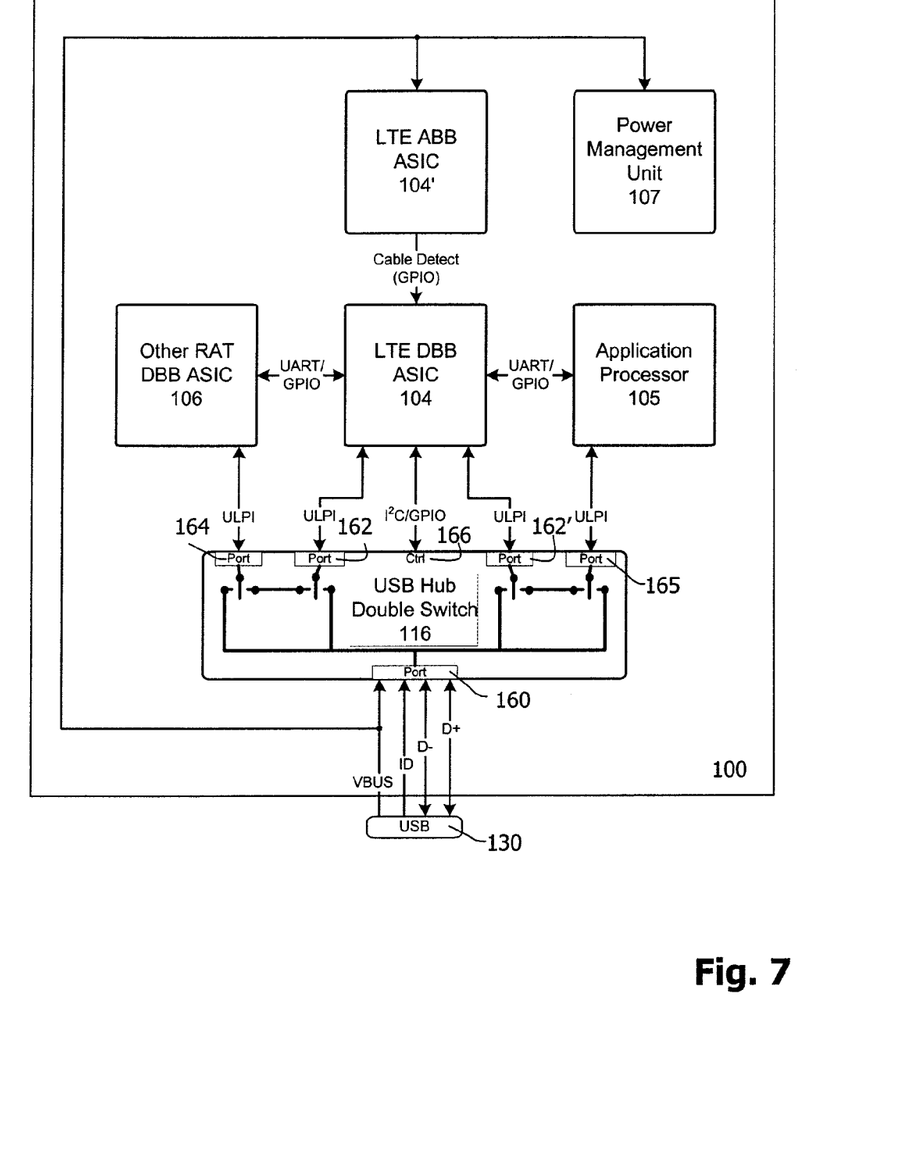
FIG. 7 shows a further apparatus embodiment.

FIG. 7 shows a further embodiment of a mobile device 100 with three functional modules 104, 105, 106 that may be selectively coupled via a "double switch" hub circuit 116 either with each other or with a USB port 130 of a host device. The first functional module 104 is a mobile platform ASIC with a digital baseband (DBB) processor supporting LTE, the second functional module 106 is a mobile platform ASIC with a DBB supporting any other RAT (such as UMTS), and the third functional module 105 is an application module comprising an application processor (not shown) supporting, for example, the Symbian operating system. The mobile platform module 104 is directly coupled via control interfaces to both the other mobile platform module 106 and the application module 105.

In addition to the three functional modules 104, 105, 106 coupled to the hub circuit 116, the mobile device 100 comprises two further functional modules 104', 107. A first one 104' of the further functional modules is a mobile platform ASIC with an analog baseband (ABB) processor for LTE (coupled to the LTE DBB ASIC 104), and the other functional module 107 is in charge of power management.

The hub circuit 116 is configured as a "double switch" device with two times the signal branches and switching mechanism shown in FIG. 5 but only a single control port 166 for controlling both switching mechanisms and only a single upstream port 160 interfacing the USB port 130 of the host device. The two mobile platform modules 104, 106 are coupled to two downstream ports 162, 164, respectively, of a first switching section of the hub circuit 116 in the same manner as illustrated in FIG. 5. A more detailed description of the first switching section will thus be omitted here.

The mobile platform module 104 with the LTE DBB ASIC is additionally coupled to a third downstream port 162' of the of the hub circuit 116, and the application module 105 is coupled to a fourth downstream port of the hub circuit 116. The third and fourth downstream ports 162', 165 belong to a second switching section of the hub circuit 116.

Via this second switching section, the platform module 104 with the LTE DBB ASIC can selectively be coupled to the application module 105 to provide an application executed by the application processor residing on the application module 105 with LTE network access. Additionally, the second switching section is adapted to couple one or both of the mobile platform module 104 and the application module 105 to the single upstream port 160. When coupled to the upstream port 160, the services provided by the mobile platform module 104 and the application module 105 can be accessed via its USB port 130 by the host device.

As has become apparent from the above description of several embodiments, it is advantageous to provide a switching hub between the functional modules and the external device. Such a solution avoids drawbacks associated with scenarios in which the switching hub is not present and in which each functional module needs to be provided with separate data interfaces to the other functional module and to the external device. The solution presented by the present embodiments has the advantage that only one USB data interface is needed on each functional module. This fact saves ASIC area and therefore production costs.

If one of the functional modules is connected to another functional module which supports anyhow more than one USB interface, the remaining USB interface of the other functional module can be used for other purposes, such as a connection to Ultra-Broadband (UBB) chips or to a USB Universal Integrated Circuit Card (UI CC). Another advantage results from a lower power consumption as no inter-functional module data interface needs to be powered up as each functional module can autonomously handle the user data transfer to the external device.

The solution of having functional module-specific data interfaces towards the external device also simplifies other functional module-specific functionalities via these data interfaces, such as debugging, flashing, data mass storage and the like. Moreover, existing software tools for these purposes can be reused as each functional module can be accessed separately.

Further, the development efforts inside the functional modules are decreased as the data path is the same as for conventional stand-alone cases (i.e., as for mobile devices comprising only a single mobile platform module). There is thus no need to implement a specific user data path for the case in which one mobile functional module handles the interface towards the external device and the other mobile functional module handles the network access.

Figure 8:
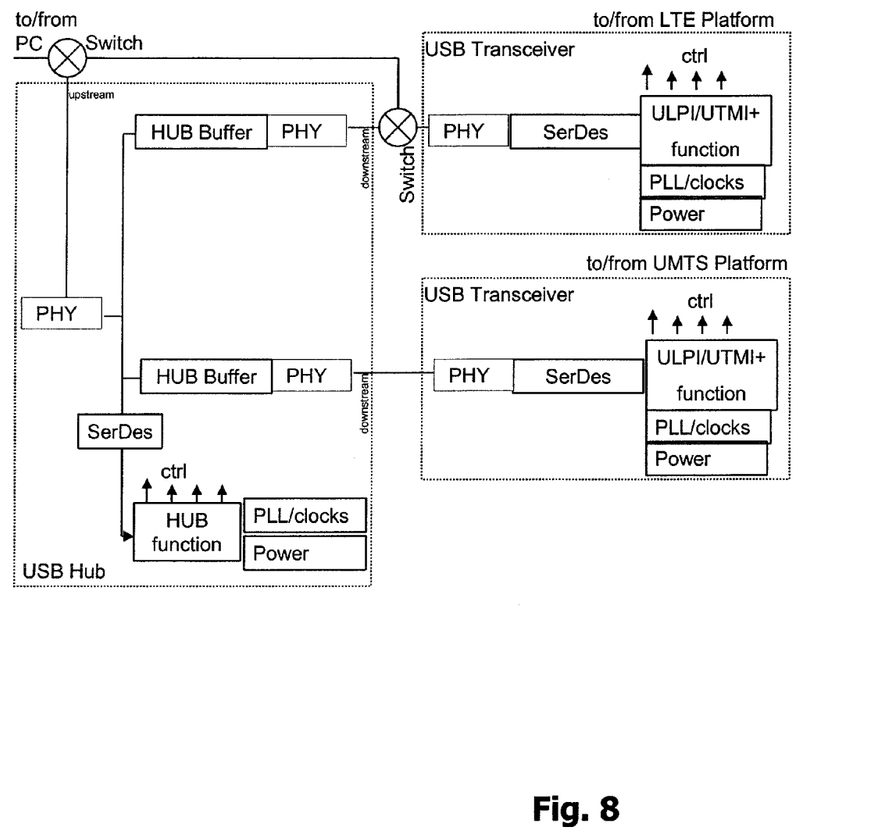
FIG. 8 shows an alternative configuration of hub and transceiver components.

The functions of the hub circuit 116 discussed above in context with FIGS. 5 and 6 could also be "simulated" using a "conventional" USB hub, plus an external switching mechanism and two separate USB transceivers as illustrated in FIG. 8.

Compared to the implementation shown in FIG. 8, the hub circuit 116 of FIGS. 5 and 6 is much more efficient as regards current consumption. The total current consumption of the components shown in FIG. 8 will amount to approximately 300 to 500 mA (USB hub: 200-300 mA, USB transceivers: 2×30-50 mA, USB components on LTE/UMTS platforms: 2×20 mA). In use cases as shown in FIG. 3, no external current source (external device) will be available, so all the required current will have to be taken from the battery of the mobile device. This situation will be unacceptable for small mobile devices such as mobile telephones with a limited battery capacity.

In contrast to the implementation shown in FIG. 8, the hub circuit 116 of FIGS. 5 and 6 is much more power efficient. For example, the number of PHY blocks, and the resulting power consumption, can be reduced. As the PHY blocks also require significant chip space, the solution of FIGS. 5 and 6 also safes ASIC area. In addition to a reduced power consumption and less chip area, further advantages of the implementation of FIGS. 5 and 6 result from the fact that fewer pins need to be provided for contacting purposes.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. An apparatus comprising:
   at least one of a first functional module and a first contacting structure configured to receive the first functional module;
   at least one of a second functional module and a second contacting structure configured to receive the second functional module; and
   a hub circuit comprising:
      a first downstream port connected to the first functional module;
      a second downstream port connected to the second functional module;
      an upstream port configured to be coupled to a host device, wherein the hub circuit is configured to couple the upstream port with at least one of the first and the second downstream ports; and
      a switching mechanism configured to selectively couple the first downstream port internally within the hub circuit with the second downstream port to enable a data transfer between the first functional module and the second functional module.

2. The apparatus of claim 1, further comprising a controller configured to generate a control signal for controlling the switching mechanism, wherein the controller is responsive to detection of the host device being coupled to the apparatus.

3. The apparatus of claim 2, wherein the hub circuit further comprises a control port configured to receive the control signal.

4. The apparatus of claim 1, wherein the hub circuit has a power-down mode that is assumable by the hub circuit when the first downstream port is coupled with the second downstream port.

5. The apparatus of claim 1, wherein the hub circuit further comprises a first interface component associated with the first downstream port and a second interface component associated with the second downstream port.

6. The apparatus of claim 5, wherein the first interface component and the second interface component are configured in accordance with at least one of the Universal Serial Bus 2.0 Transceiver Macrocell Interface (UTMI) standard, the UTMI Low Pincount Interface (ULPI) standard and the Universal Serial Bus High Speed Interchip (HSIC) standard.

7. The apparatus of claim 1, wherein the hub circuit further comprises a signal adaptor for converting a signal between a digital signal domain and an analog signal domain, wherein the signal is a signal communicated between the upstream port and either the first downstream port or the second downstream port.

8. The apparatus of claim 1, wherein the hub circuit comprises a transceiver component associated with one or both of the first and the second downstream ports.

9. The apparatus of claim 8, wherein the hub circuit is switchable into a bypass mode in which only the transceiver component is active.

10. The apparatus of claim 9, wherein in the bypass mode only a single communication branch between the upstream port and one of the first downstream port and the second downstream port is active.

11. The apparatus of claim 1, wherein the first and second downstream ports are parallel ports and the upstream port is a serial port, and wherein the hub circuit further comprises at least one serial-to-parallel converter arranged between a parallel signal domain including the first and second downstream ports and a serial signal domain including the upstream port.

12. The apparatus of claim 11, wherein the switching mechanism is substantially located in the parallel signal domain.

13. The apparatus of claim 11, wherein the switching mechanism is substantially located in the serial signal domain.

14. The apparatus of claim 1, wherein the hub circuit is realized in the form of a dedicated integrated circuit.

15. The apparatus of claim 1, wherein the hub circuit is integrated with at least one of the first functional module, the second functional module, a part of the first functional module and a part of the second functional module in an Application Specific Integrated Circuit (ASIC).

16. The apparatus of claim 1, wherein at least one of the first functional module and the second functional module is configured to provide one or more services to at least one of the other functional module and the host device, and wherein the services include at least one of network access, mass data storage, audio services, video services, multimedia services, Digital Rights Management (DRM) services, Object Exchange (OBEX) services, application services and device management services.

17. The apparatus of claim 1, wherein the upstream port is configured as a Universal Serial Bus (USB) host port, and wherein the first and second downstream ports are configured as USB device ports.

18. The apparatus of claim 17, wherein a data interface of at least one of the first functional module and the second functional module is switchable between a USB device mode and a USB host mode.

19. The apparatus of claim 1, wherein the apparatus is configured as at least one of a mobile terminal, a mobile telephone and a network card.

20. The apparatus of claim 1, further comprising at least one further functional module and/or at least one further contacting structure configured to receive the at least one further functional module, and the hub circuit having at least one further downstream port connectable to the at least one further functional module.

21. An integrated circuit, the integrated circuit comprising:
a first downstream port configured for connection to a first functional module;
a second downstream port configured for connection to a second functional module;
an upstream port configured to be coupled to a host device;
a mechanism configured to couple the upstream port with at least one of the first and the second downstream ports;
a switching mechanism for selectively coupling the first downstream port internally within the integrated circuit with the second downstream port to enable a data transfer between the first functional module and the second functional module;
a control port configured to receive a control signal for controlling the switching mechanism; and
a signal adaptor configured to convert signals passing through the upstream port between a digital signal domain and an analog signal domain.

22. An integrated circuit, the integrated circuit comprising:
a first downstream port configured for connection to a first functional module;
a second downstream port configured for connection to a second functional module;
an upstream port configured to be coupled to a host device, wherein the integrated circuit is configured to couple the upstream port with at least one of the first and the second downstream ports;
a switching mechanism for selectively coupling the first downstream port internally within the integrated circuit with the second downstream port to enable a data transfer between the first functional module and the second functional module,
wherein the first and second downstream ports are parallel ports and the upstream port is a serial port, and wherein the integrated circuit further comprises at least one serial-to-parallel converter arranged between the first and second downstream ports and the upstream port to convert signals passing between the first and second downstream ports and the upstream port between a parallel signal domain and a serial signal domain.

23. A method comprising:
receiving a first control signal;
responsive to the first control signal, coupling a first downstream port internally within a hub circuit with a second downstream port to enable a data transfer between a first functional module and a second functional module;
receiving a second control signal generated in response to detection of the host device being coupled to an upstream port; and
responsive to the second control signal, decoupling the first downstream port from the second downstream port to disable a data transfer between the first functional module and the second functional module.

24. A non-transitory computer readable recording medium having stored thereon program code portions that, when run on a computing device, cause the computing device to perform a method comprising:
receiving a first control signal;
responsive to the first control signal, coupling a first downstream port internally within a hub circuit with a second downstream port to enable a data transfer between a first functional module and a second functional module;
receiving a second control signal generated in response to detection of the host device being coupled to an upstream port; and
responsive to the second control signal, decoupling the first downstream port from the second downstream port to disable a data transfer between the first functional module and the second functional module.

* * * * *